United States Patent [19] [11] 3,765,731
Kilbane, Jr. [45] Oct. 16, 1973

[54] TRACTION CLEAT AND DRIVE BELT WITH SUCH ATTACHED
[75] Inventor: James A. Kilbane, Jr., Excelsior, Minn.
[73] Assignee: Norman W. Lund, Excelsior, Minn.
[22] Filed: Oct. 8, 1971
[21] Appl. No.: 187,653

Related U.S. Application Data
[63] Continuation-in-part of Ser. No. 94,396, Dec. 2, 1970.

[52] U.S. Cl. .............................. 305/35 EB, 305/54
[51] Int. Cl. ............................................ B62d 55/24
[58] Field of Search ................ 305/54, 35 EB, 35 R, 305/55; 152/228, 230; 180/5 R

[56] References Cited
UNITED STATES PATENTS
3,435,873   4/1969   Weier ..................................... 305/54
3,572,851   3/1971   Schuler.................................. 305/54
3,485,312  12/1969   Swenson ............................ 180/5 R OTHER PUBLICATIONS
Safety First with Talonic Cleats – Advertising Brochure of Talonic Inc., Victoria Minn.

Primary Examiner—Richard J. Johnson
Attorney—Gary L. Griswold

[57] ABSTRACT

A traction cleat for a snowmobile drive belt which provides for resistance to slippage in both the longitudinal and transverse direction relative to the snowmobile and which comprises a base with longitudinal, latitudinal, and vertical dimensions, and a plurality of projections which (1) are integral with said base, (2) all extend in the same and vertical direction from said base, and (3) are spaced along the longitudinal dimension of said base, said projections being aligned longitudinally relative to said base such that there are at least two longitudinal alignments of projections with the projections of at least one of said alignments being at an angle of less than 90° relative to the longitudinal-latitudinal plane of said base; and a drive belt with said cleats attached thereto.

10 Claims, 14 Drawing Figures

Patented Oct. 16, 1973

INVENTOR
JAMES ANTHONY KILBANE, JR.

AGENT

Patented Oct. 16, 1973
3,765,731
3 Sheets-Sheet 2
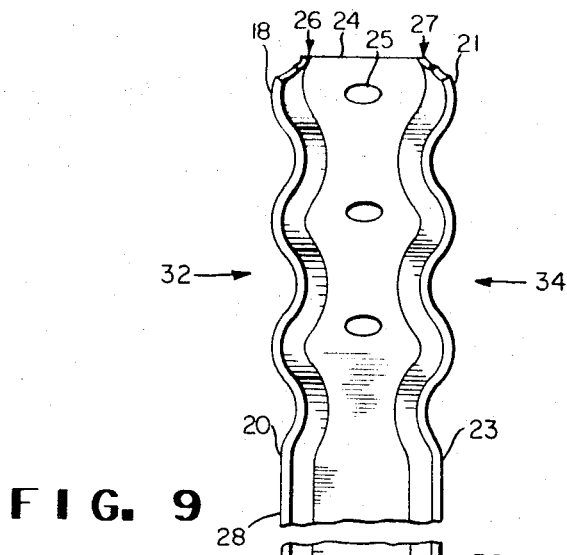
FIG. 9
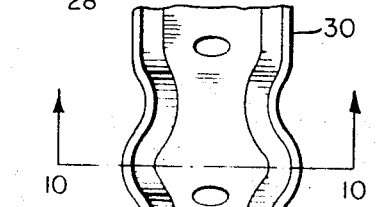
FIG. 10
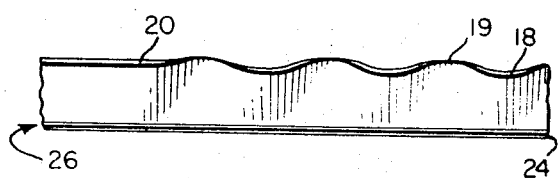
FIG. 11
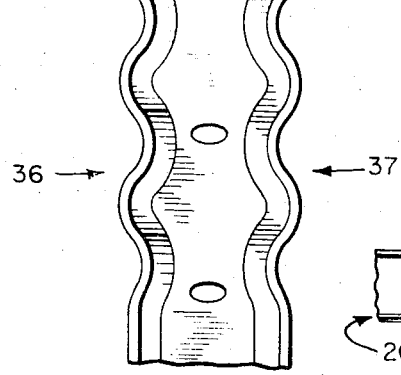
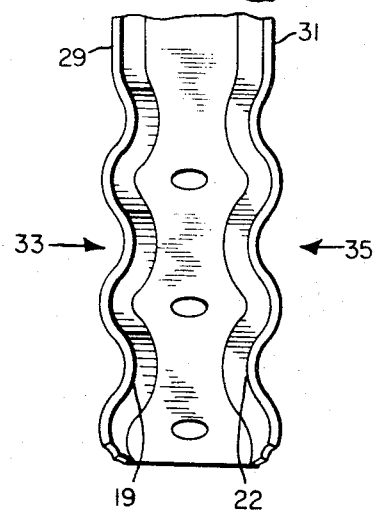
INVENTOR
JAMES ANTHONY KILBANE, JR.
BY
AGENT

INVENTOR
JAMES ANTHONY KILBANE, JR.

BY *Gary L. Griswold*

AGENT 3,765,731

TRACTION CLEAT AND DRIVE BELT WITH SUCH ATTACHED

CROSS REFERENCE TO RELATED APPLICATION

This application is a continuation-in-part of my co-pending U.S. application Ser. No. 94,396, filed Dec. 2, 1970.

BACKGROUND OF THE INVENTION

This invention relates to an improved traction cleat for drive belts. Particularly, this invention relates to a traction cleat for a snowmobile drive belt which provides for resistance to slipping in both the longitudinal and transverse direction relative to the snowmobile.

In the manufacture of snowmobile drive belts it is the normal practice to attach along the longitudinal dimension of such belts cleats which run substantially the width of the belt. Such cleats normally have a cross section shaped like a U and have the bottom of the U attached to the belt, the bottom of the U being uniplanar. The cleats give longitudinal traction to the snowmobile but do not provide sufficient resistance to transverse slippage of the snowmobile. Short and narrower U shaped additions with the upper portion of the U pointed have been riveted to the drive belt inside and on top of the aforesaid cleats. Such additions have proved unsatisfactory in producing the required resistance to slipping and also were not satisfactory in their ability to withstand the stress applied to such. Therefore, a satisfactory cleat was sought.

SUMMARY OF THE INVENTION

Such a traction cleat for a drive belt has been found. It comprises a base with longitudinal, latitudinal, and vertical dimensions, and a plurality of projections which (1) are integral with said base, (2) all extend in the same and vertical direction from said base, and (3) are spaced along the longitudinal dimension of said base, said projections being aligned longitudinally relative to said base such that there are at least two longitudinal alignments of projections with the projections of at least one of said alignments of projections being at an angle of less than 90° relative to the longitudinal-latitudinal plane of said base.

The traction cleat when attached to the drive belt forms a traction drive belt which comprises a belt with longitudinal, latitudinal, and vertical dimensions and a plurality of the aforesaid traction cleats attached thereto, said cleats being all spaced along the longitudinal dimension of the same surface of the belt with the longitudinal dimension of said traction cleats corresponding to the latitudinal dimension of the belt.

BRIEF DESCRIPTION OF THE DRAWINGS

FIG. 9 is a top view of another embodiment of the traction cleat.

FIG. 10 is a cross section of the embodiment of the traction cleat of FIG. 9.

FIG. 11 is a partial side view of the embodiment of the traction cleat of FIG. 9.

DESCRIPTION OF PREFERRED EMBODIMENTS

Figure 1:
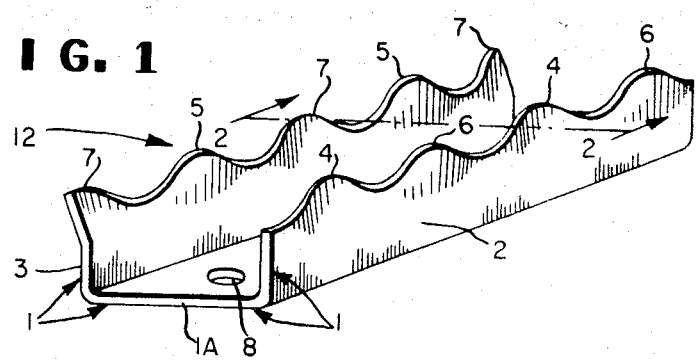
FIG. 1 is a perspective of one embodiment of the traction cleat.
Figure 3:
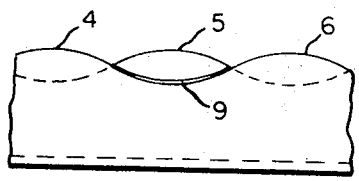
FIG. 3 is a partial side view of the traction cleat of FIG. 1 indicating the latitudinal alignment and edge profile of the traction cleat of FIG. 1.

The traction cleat as described above can vary in the type of base and projections. FIG. 1 depicts one embodiment of the cleat. The base 1 of the cleat in FIG. 1 has a first substantially uniplanar layer 1A with a second substantially uniplanar layer 2 and 3 extending from each of the two latitudinal sides of said first layer running the longitudinal dimension of said first substantially uniplanar layer 1A, said second layers 2 and 3 both being integral with said first layer 1A, both being extended in the same direction from said first layer 1A which is the vertical dimension of said base 1 and both being extended at about a 90° angle to said first layer 1A. The base 1 of the cleat has projections 4, 5, 6, 7 integral with and extending from it in its vertical direction, said projections being spaced along the longitudinal dimension of the base 1. The longitudinal spacing of the projections 4, 5, 6, 7 shown in detail in FIG. 3, is such that the projections 4 and 6 are in latitudinal alignment with the spaces between the projections 5 and 7 and vice versa. The traction cleat has holes 8 which are means for attaching the cleat to the drive belt via rivets, bolts, etc. (not shown).

Figure 2:
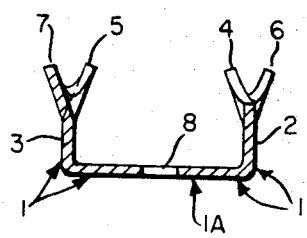
FIG. 2 is a cross section of FIG. 1 indicating the longitudinal alignment of the traction cleat.

FIG. 2 is a cross section of FIG. 1 and indicates the alignment of the projections 4, 5, 6, 7 along the longitudinal dimension of the cleat. The base 1 with the holes 8 are again shown. The projections form four longitudinal alignments of projections, two from each of the second substantially uniplanar layers 2 and 3 of the base 1, depicted as 4, 5, 6 and 7 with the projections of all four alignments of projections being at an angle of less than 90° relative to the longitudinal-latitudinal plane (first substantially uniplanar layer 1A) of the base 1. Normally, the projections will be at an angle of greater than about 45° relative to the longitudinal-latitudinal plane of the base. The varying longitudinal alignments of the projections and angular orientation of such gives the cleat resistance to slippage in the longitudinal dimension of the cleat or in the transverse dimension of the snowmobile.

FIG. 3 indicates the latitudinal alignment and edge profile of the cleat of FIG. 1. The edge profile of the cleat of FIG. 1 depicts the projections 4, 5, 6, 7 as curved while the latitudinal alignment of the projections is such that projection 5 is latitudinally aligned with the space 9 between projections 4 and 6.

Figure 4:
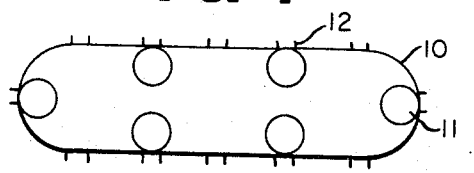
FIG. 4 is a side view of a snowmobile drive belt with traction cleats attached thereto, the drive belt being on bogie wheels.

FIG. 4 is a side view of a drive belt 10 on bogie wheels 11 of a snowmobile. The snowmobile is not shown. In some snowmobiles some or all of the bogie wheels are replaced by a polymeric material slide frame. The drive belt with cleats attached of this invention is also useful on such slide frames or on any other arrangement for holding the drive belt for rotation. Along the longitudinal dimension and same surface of the drive belt 10 which has longitudinal, latitudinal and vertical dimensions is attached a plurality of cleats 12 with the longitudinal dimension of the cleats corresponding to the latitudinal dimension of the belt. The bottom of the side view indicates the position of the cleats 12 as they would be when in operative association with the material over which the snowmobile is moving such as snow or ice.

Figure 5:
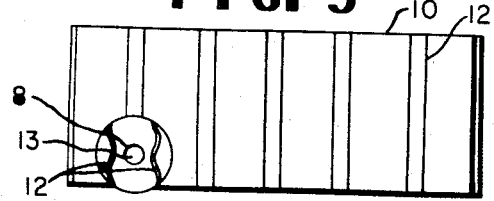
FIG. 5 is a bottom view of FIG. 4 with a part enlarged.

FIG. 5 is a bottom view of the traction drive belt 10 of FIG. 4. FIG. 5 indicates that the cleats 12 run substantially the latitudinal dimension of the belt 10. The enlargement indicates that the cleats 12 are attached to the drive belt 10 by rivets 13 through holes 8 of the cleats 12. Other means of attachment such as bolts can be utilized.

Figure 6:
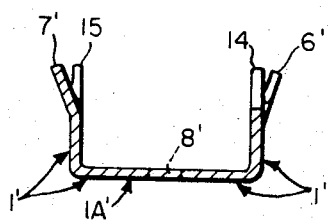
FIG. 6 is a cross section for a traction cleat embodying a different longitudinal alignment from that shown in the cross section in FIG. 2.

FIG. 6 depicts a different longitudinal alignment for the projections from that shown in FIG. 2. In this embodiment of the cleat, the base 1' and holes 8' are the same as those in FIG. 1. The longitudinal alignment of the projections is such that there are four alignments of projections 6', 7', 14 and 15 but the projections of only two alignments 6' and 7' are at an angle of less than 90° relative to the longitudinal-latitudinal plane (first substantially uniplanar layer 1A') of base 1' while the projections of alignments of projections 14 and 15 are at about a 90° angle to the longitudinal-latitudinal plane (first substantially uniplanar layer 1A') of base 1'.

Figure 7:
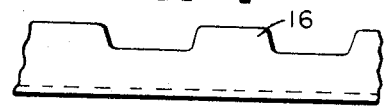
FIG. 7 depicts a side view of a traction cleat indicating a different edge profile embodiment from that of FIG. 3.
Figure 8:
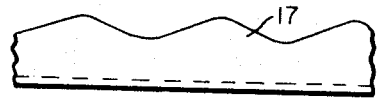
FIG. 8 depicts a side view of a traction cleat indicating a different edge profile embodiment from those of FIGS. 3 and 7.

FIG. 7 is a partial side view of a cleat showing rectangular shaped projections 16 while FIG. 8 is a partial side view of a cleat with triangular shaped projections 17. In both FIG. 7 and FIG. 8 the latitudinal alignment of the projections is such that the projections are in line latitudinally.

FIG. 9 is a top view of a preferred embodiment of the cleat. In this embodiment there are three alignments of projections 18, 19 and 20, 21, 22 and 23 extending from each of the latitudinal sides 26 and 27 of the base 24 of the cleat which also contains holes 25, i.e., means for attaching the cleat to the drive belt. The base 24 has latitudinal, longitudinal and vertical dimensions and is substantially uniplanar. From FIG. 11 which is a partial side view of the cleat of FIG. 9, it can be seen that the projections of the longitudinal alignments of projections 18, 19 and 20 extending from the latitudinal side 26 of the base 24 of the cleat are integral with each other. This is true of projections of alignments of projections 21, 22 and 23 extending from the latitudinal side 27 of the base 24 of the cleat. It can be seen from FIG. 9 that the latitudinal alignment of the projections is such that corresponding projections, i.e., 18 and 21, 19 and 22, and 20 and 23 are aligned.

It can be seen in FIGS. 10 and 11 that the projections of the three alignments of projections 18, 19 and 20 from latitudinal side 26 of the base 24 and 21, 22 and 23 from latitudinal side 27 of the base 24 are substantially equal in the distance to which they extend in the vertical direction from the base 24. From FIG. 10, it can also be seen that all three alignments of projections 18, 19 and 20 from latitudinal side 26 and 21, 22 and 23 from latitudinal side 27 of the base 24 are at an angle of less than 90° but greater than about 45° relative to the longitudinal-latitudinal plane of the base 24.

FIG. 9 shows that each of the middle longitudinal alignments of projections 20, 23 of the three longitudinal alignments of projections 18, 19, 20 and 21, 22, 23 extending from the two latitudinal sides 26 and 27 of the base 24 comprise two projections, i.e., for alignment 20 projections 28 and 29 and for alignment 23, projections 30 and 31. The projections of the middle alignments of projections are located along the longitudinal dimension of the cleat 24 such that there is a plurality of projections 32, 33, and 34, 35 from each of the other two longitudinal alignments of projections 18, 19 and 21, 22 extending from each of the latitudinal sides 26, 27 of the base 24 at each of the two longitudinal extremes of the cleat and a plurality of projections 36 and 37 from each of the other two longitudinal alignments of projections 18, 19 and 21, 22 extending from each of the latitudinal sides 26, 27 of the base 24 at the longitudinal center of the cleat. One of the two projections 28, 29 and 30, 31 of the middle alignment of projections 20, 23 separates the plurality of projections on each extreme 32, 33 and 34, 35 from the plurality of projections 36, 37 at the longitudinal center of the cleat. The middle alignments of projections comprising two projections are normally present in the cleats depicted in all the Figures for these two, normally longer, projections are the point on the cleat which contacts the drive wheels from the driving mechanism, i.e., motor, etc. of the snowmobile. A plurality of projections at these two points on the cleat would normally have an adverse effect on such drive wheels.

Figure 12:
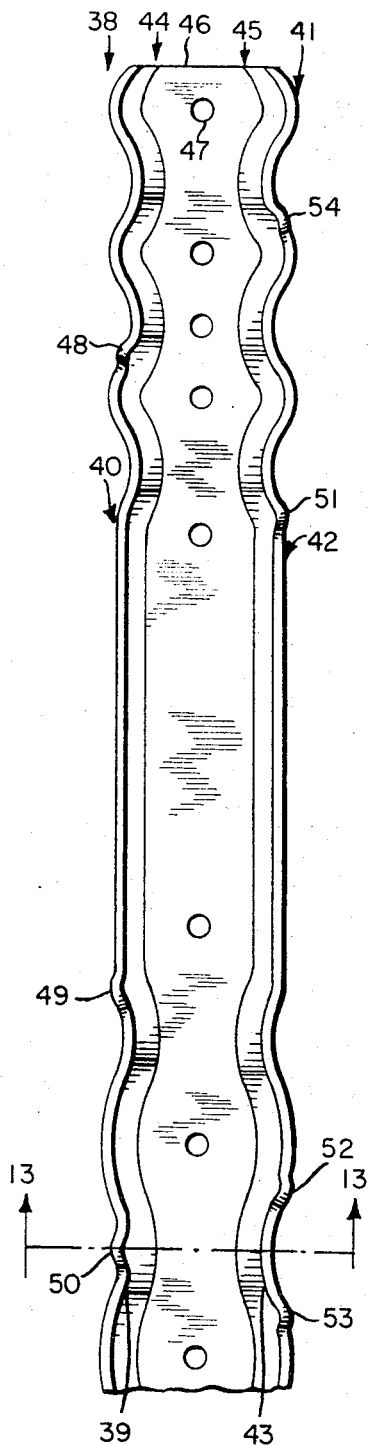
FIG. 12 is a top view of one-half (to the section line) of another embodiment of the traction cleat, the other half being an equivalent to the one depicted.
Figure 14:
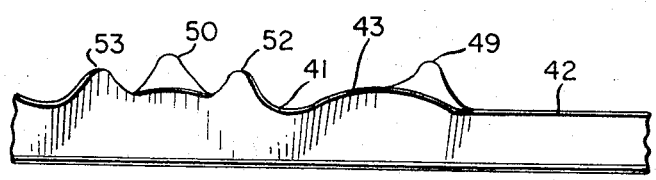
FIG. 14 is a partial side view of the embodiment of the traction cleat of FIG. 12.

FIG. 12 is a top view of one-half of another preferred embodiment of the cleat. The one-half of the cleat extends to the section line. In this embodiment, there are three alignments of projections 38, 39, and 40, 41, 42 and 43 extending from each of the latitudinal sides 44 and 45 of the base 46 of the cleat which also contains holes 47, i.e., means of attaching the cleat to the drive belt. The base 46 has latitudinal, longitudinal, and vertical dimensions and is substantially uniplanar. From FIG. 14 which is a partial side view of the cleat of FIG. 12 it can be seen that the projections of the longitudinal alignments of projections 41, 42, and 43 extending from the latitudinal side 45 of the base 46 of the cleat are integral with each other. It can also be seen that some of the projections have additional projections extending therefrom depicted as 52, 53 and 54 (of FIG. 12). These additional projections produce increased longitudinal and transverse traction relative to the snowmobile. The projections of alignments of projections 38, 39 and 40 extending from latitudinal side 44 of the base 46 of the cleat are also integral with each other. Additional projections depicted as 48 (FIG. 12) 49, and 50 extend from some of the projections of these alignments of projections. It can be seen from FIG. 12 that the latitudinal alignment of the projections is such that corresponding projections of the longitudinal alignments of projections are aligned. The additional projections may or may not extend from corresponding projections. As depicted, they do not. The additional projections can extend from any part or all of the top of the projections from which they extend, the top being the opposite end of the projection from that which contacts the base of the cleat.

Figure 13:
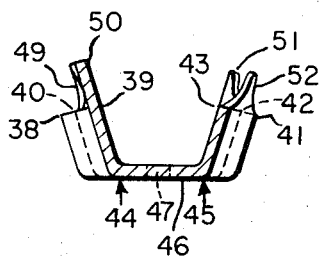
FIG. 13 is a cross section of the embodiment of the traction cleat of FIG. 12.

From FIG. 13, it can be seen that all the alignments of projections 38, 39 and 40 from latitudinal side 44 and 41, 42, and 43 from latitudinal side 45 of the base 46 are at an angle of less than 90° but greater than about 45° relative to the longitudinal-latitudinal plane of the base 46. The additional projections are normally at the same angle relative to the longitudinal-latitudinal plane of the base as the projections from which they extend. They can, however, be at a different angle as long as there is one longitudinal alignment of projections less than 90° relative to the longitudinal-latitudinal plane of the base. The middle alignment of projections 40 and 42 serve the same function as those of the cleat depicted in FIG. 9. The projections of these alignments do not and should not have additional projections extending therefrom.

The traction cleats may be made of hard rubber, steel, iron, other ferrous and nonferrous metals and polymeric material such as nylon, etc. and can be manufactured by any conventional method such as molding for the hard rubber and polymeric material, and rolling, stamping, casting or drop-forging of the metals.

The drive belts to which the traction cleats are attached can be any type of conventional endless drive belt utilized in equipment for moving on snow, ice, or substances with a similar consistency and are normally made of rubber, polyurethane, etc.

As stated above, the cleats may be attached to the drive belt of the snowmobile by rivets, bolts, etc. with the method not being critical. If the traction cleat is hard rubber or polymeric material such as nylon, it can be integral with the belt, i.e., molded as part of the belt or can be heat bonded to the belt.

The above description is a description of preferred embodiments of the invention. Many variations and modifications within the spirit of the invention will appear to those skilled in the art and such are considered to fall within the scope of the following claims.

I claim:

1. A cleat for a traction drive belt of a snowmobile comprising a channel-shaped structure having a substantially planar base; a pair of legs formed integral with and extending outwardly from said base on oppositely disposed longitudinal sides of said base, at least one of said legs and the outer edge thereof having an undulating configuration along the longitudinal length thereof; and at least one projection integrally formed with and extending from at least one leg having said undulating configuration at the edge of said leg opposite to that contacting said base, said projection extending beyond the outer edge portion of said leg.

2. The cleat of claim 1 in which each of said legs has an undulating configuration and there are a plurality of projections extending from each of said legs.

3. The cleat of claim 2 in which each of the oppositely disposed longitudinal sides of said base are formed into a plurality of smooth curves in the longitudinal direction.

4. The cleat of claim 3 in which the outer faces of said legs extending from said base undulate with the curved sides at the junction area of said base and legs, the undulating faces extending to the outwardly extending edges of said legs so that said legs and edges thereby undulate toward and away from a longitudinally extending plane normal to said base.

5. The cleat of claim 4 in which the offset distance of adjacent undulations from said plane are greater than the thickness of the material of said legs.

6. A traction drive belt comprising a belt with a plurality of the traction cleats of claim 1 attached thereto, said traction cleats being spaced along the longitudinal dimension of the belt with the longitudinal side of said base of said cleats corresponding to the lateral dimension of the belt.

7. A traction drive belt comprising a belt with a plurality of the traction cleats of claim 2 attached thereto, said traction cleats being spaced along the longitudinal dimension of the belt with the longitudinal side of said base of said cleats corresponding to the lateral dimension of the belt.

8. A traction drive belt comprising a belt with a plurality of the traction cleats of claim 3 attached thereto, said traction cleats being spaced along the longitudinal dimension of the belt with the longitudinal side of said base of said cleats corresponding to the lateral dimension of the belt.

9. A traction drive belt comprising a belt with a plurality of the traction cleats of claim 4 attached thereto, said traction cleats being spaced along the longitudinal dimension of the belt with the longitudinal side of said base of said cleats corresponding to the lateral dimension of the belt.

10. A traction drive belt comprising a belt with a plurality of the traction cleats of claim 5 attached thereto, said traction cleats being spaced along the longitudinal dimension of the belt with the longitudinal side of said base of said cleats corresponding to the lateral dimension of the belt.

* * * * *

UNITED STATES PATENT OFFICE
CERTIFICATE OF CORRECTION

Patent No. 3,765,731    Dated October 16, 1973

Inventor(s) James A. Kilbane, Jr.

It is certified that error appears in the above-identified patent and that said Letters Patent are hereby corrected as shown below:

"Assignee" was listed as set forth below.

"Assignee: Norman W. Lund, Excelsior, Minn."

and should instead be listed as:

"Assignee of an undivided one-half interest: Norman W. Lund, Excelsior, Minn."

Signed and sealed this 7th day of May 1974.

(SEAL)
Attest:

EDWARD M. FLETCHER, JR.
Attesting Officer

C. MARSHALL DANN
Commissioner of Patents